Nov. 7, 1967 G. R. KINGSBURY ET AL 3,350,763
METHOD OF MAKING DUAL-MATERIAL FLANGE BEARINGS
Filed Oct. 21, 1965

INVENTORS
GEORGE R. KINGSBURY
CHARLES H. JUNGE
WILLIAM A. WEINKAMER
BY RAYMOND L. SLATER

ATTORNEY

United States Patent Office 3,350,763
Patented Nov. 7, 1967

3,350,763
METHOD OF MAKING DUAL-MATERIAL FLANGE BEARINGS
George R. Kingsbury, Mayfield, Charles H. Junge, University Heights, William A. Weinkamer, Mentor, and Raymond L. Slater, Novelty, Ohio, assignors to Clevite Corporation, a corporation of Ohio
Filed Oct. 21, 1965, Ser. No. 500,065
9 Claims. (Cl. 29—149.5)

This invention pertains to supplemental methods for making dual-material flange bearings. Reference is made to copending application Ser. No. 397,251, filed Sept. 17, 1964, now Patent No. 3,251,119, granted May 17, 1966, and entitled "Method of Making Dual-Material Flange Bearings," and assigned to the same assignee as the present invention.

Dual-material flange bearings are engine sleeve bearings which incorporate the features of a strong, high-load-carrying barrel liner which has good, fatigue-resistant properties, combined with a soft babbitt or white metal flange or thrust face which has a superior surface action characteristic for resistance to seizure and which has a high degree of conformability, while still maintaining sufficient, inherent, load-carrying capacity to withstand the lesser thrust loads.

The dual-material flange bearing is particularly adapted for automotive applications, for example, engine sleeve bearings, wherein it is highly desirable to have the plane of the flange face or faces perpendicular to the axis of the barrel. In the past, the importance of this relationship has been recognized, but in mass production at low cost it is impossible always to achieve a perfectly perpendicular condition.

In the dual-material flange bearing of the present invention the barrel liner is made of a high-load-carrying bearing material, with or without an overlay plate, and the flange face(s) is made of a conformable, cast white metal or babbitt having excellent surface action properties. The high conformability of the metal on the flanges permits the axis of the assembled bearing bore and the plane of the flange faces to be off-perpendicular within reasonable tolerances for inexpensive mass production. Also, with the high degree of conformability the surface roughness of the mating part can be higher, thereby reducing the cost of machining the mating part. Since the flanges do not have to withstand high unit cyclic loads, the use of cast white metal or babbitt on the flange faces improves the bearing action thereof and also solves the problem of conformability and misalignment.

It is therefore an object of the present invention to provide a dual-material flange bearing and a supplemental method of making same whereby the bearing material of the barrel is formed of a high-load-carrying-capacity material and whereby the bearing material of the flange or flanges is made of a conformable white metal such as babbitt.

Another object of the present invention is to provide a number of practical, supplemental methods for manufacturing the strip material from which dual-material flange bearings may be made.

For a better understanding of the present invention, together with other and further objects thereof, reference is made to the following description taken in connection with the accompanying drawings, and its scope will be pointed out in the appended claims.

With reference to the drawings, there is shown in FIGURE 1 a perspective view of a typical flange bearing;

In accordance with the invention, there is provided a method of producing a thin-walled, steel-backed, dual-material flange sleeve bearing from a strip of steel. The process comprises the steps of applying a strong, fatigue-resistant, relatively hard bearing material to the surface of said steel strip in order that said strong bearing material may adhere thereto. The strong bearing material portion of the strip is worked to form barrel area means and flange area means of substantially the same thickness. A white metal bearing material is cast upon the strip which is more conformable and is softer than the strong, fatigue-resistant bearing material, resulting in a composite tri-metal strip having barrel area means and flange area means of substantially the same thickness. The steel at the flange area means is worked to a substantially lesser thickness than the steel at the barrel area means. A flange sleeve bearing is formed from the strip with the barrel area means and the flange area means forming the barrel and flange means of the bearing. A substantial portion or all of the cast white metal bearing material is removed from the barrel portion of the bearing whereby the barrel portion of the formed bearing is formed essentially of the remaining strong bearing material, while the surface of the flange means is formed of said conformable white metal bearing material.

Preferably, in a specific embodiment of the invention, the relatively hard bearing material is selected from a group consisting of cast aluminum, cast aluminum alloy, clad aluminum, clad aluminum alloy, cast bronze, sintered bronze, and sintered copper-tin infiltrated with babbitt. Furthermore, said composite tri-metal strip may be cut transverse to its length to form a plurality of bearing blanks, each having flange area means and barrel area means. Said blanks may then be channeled and formed into flange sleeve bearings and subsequently have the straddle or flange means steel portion machined to a lesser thickness than the barrel area means steel thickness or, prior to the forming operation, the bearing blanks may have the flange area means machined to a lesser thickness than the barrel area means and then be subsequently formed into a flange bearing.

Figure 1:
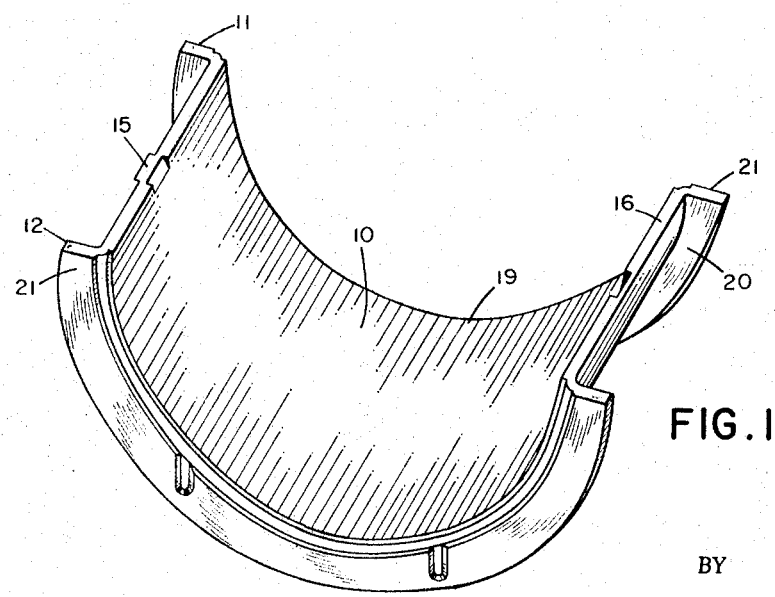

With reference to the drawings, there is shown in FIGURE 1 a dual-material flange bearing. The bearing is comprised of a barrel or radial load-carrying portion 10 and one or more flanges or thrust faces 11, 12, the planes of which should be approximately perpendicular to the axis of the barrel 10. A notched portion 15 is provided on one or more of the parting line faces 16 to locate the bearing in position in the assembled unit, as is well known in the automotive art.

The bearing is comprised of a steel backing layer 20, to the flange faces 11 and 12 of which is adhered a conformable layer of white metal or of lead or tin base babbitt 21, with a thin layer of bronze 19 between the steel and the conformable layer 21, and to the barrel portion 10 of which is adhered a layer 19 of strong, high-load-carrying bearing material which layer 19 may or not be provided with a micro-thin plated or cast layer 21 of bearing material on the surface thereof.

It is essential in the production of acceptable internal combustion engines that the plane of the flange face be as nearly perpendicular as possible to the axis of the barrel. When the bearing is assembled in the engine crank case, the barrel face fits concentrically but tightly around the crank shaft, with allowance for assembly clearances, and the flange face is subjected to meeting the mating surface during engine operation. If the plane of the flange face is not perpendicular to the axis of the barrel, less than the entire area of the flange face engages the corresponding mating crank shaft thrust runner.

To provide a more conformable flange face than as heretofore existed, while still being able to sustain normally encountered thrust loads, the present invention provides white conformable bearing material flange faces, together with a strong, high-load-carrying, fatigue-resistant bearing face in the bore or radial portion of the bearing.

To provide an inexpensive, dual-material flange bearing, several practical methods have been devised. All of these methods are hereinafter described in detail. Briefly, in Method 1 there is produced a fatigue-resistant, bearing material barrel with cast conformable bearing material flanges produced by reducing the flange area steel thickness and channeling the bearing surface in the appropriate places, while still in strip form. Subsequently, the strip is cut into blanks and each respective piece is formed into a finished bearing. If a form-and-flare method is employed to obtain the finished bearing shape, as is well known in the art, the channel operation may be omitted. Method 2 produces a fatigue-resistant metal barrel with cast conformable bearing material flanges produced by the same sequence of operation as described under Method 1, except that the strip is blanked before the steel reduction, channeling, and forming steps are performed. In Method 3, the bearing is formed into its final, desired, general shape before the flange area steel thickness is reduced. If desired, again, in both Methods 2 and 3, the blank may be channeled, if the roll-form method is employed, or not channled, if the flare-and-form method is used.

*Method No. 1.—Reduction of steel thickness at flange area means before form and blank*

Figure 2:
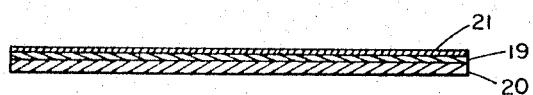
FIGURE 2 is a transverse, sectional view showing an early step in the method of making the composite strip material from which the bearing shown in FIGURE 1 may be made.
Figure 3:
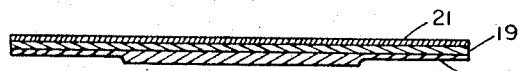
FIGURE 3 is a sectional view similar to FIGURE 2 after a step in the steel back has been made by means of a machining operation.
Figure 4:
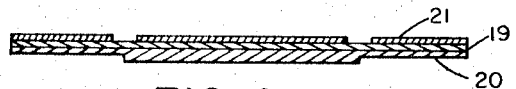
FIGURE 4 is a sectional view similar to FIGURE 3 after a grooving or channeling operation has been performed.

FIGURES 2–5 show methods by which dual-material flange bearings may be produced wherein a heavy-duty, fatigue-resistant material is used on the barrel portion of the bearing and conformable cast white metal material is used on the flange portion of the bearing. The method to be discussed first is that of reducing the steel thickness at the flange portion before transversely cutting the strip into blanks and forming the final, desired, general bearing shape. As shown in FIGURE 2, a composite trimetal strip is worked upon in various steps depicted by FIGURES 3–5. Onto the top surface of the steel strip 20 is adhered a layer of heavy-duty bearing material 19. Subsequently, a second layer of soft, conformable, white metal bearing material 21 is cast on top of the heavy-duty material 19. Methods are known and well developed for casting these materials on steel strip. The steel back of the composite tri-metal strip, shown in FIGURE 2, is then worked upon to form flange area means of a substantially lesser thickness than the steel back at the barrel area means, as shown in FIGURE 3. In a subsequent, combined or independent machining operation, the bearing surface of the bearing cross-section, shown in FIGURE 3, is then coined and/or channeled, as shown in FIGURE 4. This intermediate step is generally employed when the bearing blank is finally formed by the roll-form method. If the form-and-flare method is employed, this intermediate step is unnecessary. Following the steel thickness reduction step shown in FIGURE 3 and the optional, intermediary, channeling or grooving step shown in FIGURE 4, if necessary, the bearing strip is formed into a plurality of blanks by transversely cutting the strip at the appropriate place. After the blanking step, the blank is formed into the final, desired, general bearing shape shown in FIGURE 5.

*Method No. 2.—Reduction of steel thickness at flange area means after blank*

Figure 5:
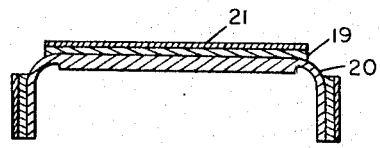
FIGURE 5 is a sectional view after the bearing has been blanked and formed into a semi-finished shape.

FIGURES 2–5 again depict this method of producing a satisfactory, dual-material, flange bearing. The only significant difference between this method and that method just previously discussed is that the operations shown in FIGURES 3–5 are performed subsequent to the blanking or transverse cutting of the tri-metal composite strip. This method would be employed commercially, preferably, where economic considerations do not justify the additional capital expenditure of providing the step of reducing the flange area means to a greater extent than the barrel area means in the strip form and the additional step of channeling or coining in the strip form.

Following the formation of the tri-metal composite strip shown in FIGURE 2, the strip is blanked into a plurality of appropriate sized blanks. The steel back of the composite, tri-metal strip, shown in FIGURE 2, is then worked upon to form flange area means of a substantially lesser thickness than the steel back at the barrel area means, as shown in FIGURE 3. In a subsequent, combined or independent machining operation the bearing surface of the bearing cross-section shown in FIGURE 3 is then coined and/or channeled, as shown in FIGURE 4. This interemediate step is generally employed when the bearing blank is finally formed by the roll-form method, and if the form-and-flare method is employed, this intermediate step is unnecessary. Lastly, the prepared blank is formed into the final, desired general bearing shape shown in FIGURE 5.

*Method No. 3.—Reduction of steel thickness at flange area means after form*

Figure 6:
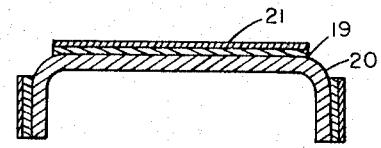
FIGURE 6 shows an optional manufacturing method whereby the strip form is made into blanks and then formed into a semi-finished shape.
Figure 7:
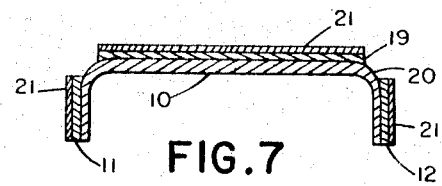
FIGURE 7 shows the formed bearing shape with a reduced flange area steel backing thickness obtained by machining the straddle dimension after the forming operation of FIGURE 6.

FIGURES 6 and 7 depict the steps followed in producing a dual-material, flange bearing by Method 3, as hereinafter described. FIGURES 3–5 are not applicable to this method. FIGURE 6 shows a bearing formed from a blank cut from a tri-metal composite strip, as shown in FIGURE 2. The generally desired bearing shape is then machined at the steel portion of the flange area means or across the straddle dimension, as shown in FIGURE 7. If desired, the bearing surface may be coined or grooved if the roll-form method of forming the desired bearing shape is employed.

*General.—Applicable to all these methods*

In all of these methods the hard, intermediate bearing material may be selected from any number of a group of heavy-duty bearing materials presently in vogue, including cast aluminum alloy, clad aluminum, clad aluminum alloy, cast bronze, sintered bronze, and sintered copper-tin infiltrated with babbitt, but not limited thereto, or may be selected from any future-developed, heavy-duty materials.

With any of the three methods, the finished machined flanges will have a relatively thicker remaining layer of white metal than the barrel portion to insure a good surface quality which will resist seizure and conform to any thrust runner misalignment. This is accomplished by finish machining to remove all or most of the babbitt in the area of the strong, intermediate bearing alloy in the barrel area. By machining away only a portion of the babbitt in the barrel area, a thin, fatigue-resistant layer of babbitt can be allowed to remain which exhibits the same qualities of seizure-resistance and conformability exhibited and sought for the flange area means. In the case of bearings which have had all of the overcast babbitt machined from the barrel surface, a precision overlay of babbitt may be electroplated on said barrel surface for the aforesaid purposes. Generally, but not necessarily, the remaining thicker cast white metal on the flange area means is "cleaned up" by machining to the required stock thickness.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. The method of producing a thin-walled, steel-backed, dual-material, flange sleeve bearing from a strip of steel which comprises the steps of: applying to the surface of said steel strip a layer of strong, fatigue-resistant, relatively hard bearing material to cause said strong bearing material to adhere thereto; in the strip form, working the strong bearing material to form barrel area means and flange area means of substantially the same thickness; in the strip form, casting white metal bearing material which is conformable and relatively softer than the strong, fatigue-resistant bearing material to form a composite tri-metal strip having barrel area means and flange area means of substantially the same thickness; working the steel at the flange area means to a substantially lesser thickness than the steel at the barrel area means; forming a flange sleeve bearing with the barrel area means of said strip forming the barrel of said bearing and with the flange area means of the strip forming the flange means of the bearing; and removing at least a substantial portion of the conformable cast white metal bearing material from the barrel portion of the bearing whereby the barrel portion of the formed bearing is formed essentially of strong bearing material, and the surface of the flange means is formed of said conformable white metal bearing material.

2. The method of producing a thin-walled, steel-backed, dual-material, flange sleeve bearing as set forth in claim 1, further characterized by: in the strip form, continuously machining the steel portion at the flange area means to a substantially lesser thickness than the steel portion at the barrel area means.

3. The method of producing a thin-walled, steel-backed, dual-material, flange sleeve bearing as set forth in claim 1, further characterized by: cutting said composite tri-metal strip transverse to its length to form a plurality of bearing blanks each having flange area means and barrel area means, thereafter machining the steel portion of the blank at its flange area means to a substantially lesser thickness than the steel portion of the bearing blank at its barrel area means.

4. The method of producing a thin-walled, steel-backed, dual-material, flange sleeve bearing as set forth in claim 3, further characterized by: first forming said flange sleeve bearing from one of said bearing blanks, and thereafter machining the steel portion or the formed bearing blank at its flange area means to a substantially lesser thickness than the steel portion of the formed bearing blank at its barrel area means.

5. The method of producing a thin-walled, steel-backed, dual-material, flange sleeve bearing as set forth in claim 3, further characterized by: first machining the steel portion of the bearing blank at its flange area means to a substantially lesser thickness than the steel portion of the bearing blank at its barrel area means, and thereafter forming the machined bearing blank into a flange sleeve bearing.

6. The method of producing a thin-walled, steel-backed, dual-material, flange sleeve bearing from a strip of steel which comprises the steps of: applying to the surface of said steel strip a layer of strong, fatigue-resistant, relatively hard bearing material to cause said strong bearing material to adhere thereto; in the strip form, working the strong bearing material to form barrel area means and flange area means of substantially the same thickness; in the strip form, casting white metal bearing material which is conformable and relatively softer than the strong, fatigue-resistant bearing material to form a composite tri-metal strip having barrel area means and flange area means of substantially the same thickness; cutting said composite tri-metal strip transverse to its length to form a plurality of bearing blanks each having flange area means and barrel area means; forming a flange sleeve bearing from one of the bearing blanks with the barrel area means of said blank forming the barrel of said bearing and with the flange area means of the blank forming the flange means of the bearing; machining the steel portion of the formed bearing at its flange area means to a substantially lesser thickness than the steel portion of the formed bearing at its barrel area means; removing at least a substantial portion of the conformable cast white metal bearing material from the barrel portion of the bearing whereby the barrel of the finished bearing is formed essentially of the said strong bearing material and the surface of the flange means is formed of said conformable white metal bearing material.

7. The method of producing a thin-walled, steel-backed, dual-material, flange sleeve bearing, comprising the steps of: providing a length of steel strip, applying to the surface of said steel strip a layer of strong, fatigue-resistant, relatively hard bearing material to cause said strong bearing material to adhere thereto; in the strip form, working the strong bearing material to form barrel area means and flange area means of substantially the same thickness; in the strip form, casting white metal bearing material onto said barrel area means and flange area means to establish a composite tri-metal strip of substantially uniform, overall thickness; cutting said composite tri-metal strip transverse to its length to form a plurality of bearing blanks each having flange area means and barrel area means; machining the steel portion of a bearing blank at its flange area means to a substantially lesser thickness than the steel portion of the bearing blank at its barrel area means; forming from said machined bearing blank a flange sleeve bearing and during said forming operation removing at least a substantial portion of the white metal bearing material layer from said barrel area means.

8. The method of producing a thin-walled, steel-backed, dual-material, flange sleeve bearing from a strip of steel which comprises the steps of: applying to the surface of the steel strip a layer of strong, fatigue-resistant, relatively hard bearing material to cause said strong bearing material to adhere thereto; in the strip form, working the strong bearing material to form barrel area means and flange area means of substantially the same thickness; in the strip form, casting white metal bearing material which is conformable and relatively softer than the strong, fatigue-resistant bearing material to form a composite tri-metal strip having barrel area means and flange area means of substantially the same thickness; in the strip form, machining the steel back of said tri-metal strip at the flange area means to a substantially lesser thickness than the steel back at the barrel area means; cutting said composite tri-metal strip transverse to its length to form a plurality of bearing blanks each having flange area means and barrel area means; forming a flange sleeve bearing from one of the machined bearing blanks with the barrel area means of the tri-metal strip forming the barrel of the bearing and with the flange area means of the strip forming the flanges of the bearing, and thereafter removing at least a substantial portion of the conformable cast white metal bearing material from the barrel portion of the bearing.

9. The method of producing a thin-walled, steel-backed, dual-material, flange sleeve bearing from a strip of steel which comprises the steps of: applying to the surface of said steel strip a layer of strong, fatigue-resistant, relatively hard bearing material selected from the group consisting of cast aluminum, cast aluminum alloy, clad aluminum, clad aluminum alloy, cast bronze, sintered bronze, sintered copper-tin infiltrated with babbitt to cause said strong bearing material to adhere thereto; in the strip form, working the strong bearing material to form barrel area means and flange area means of substantially the same thickness; in the strip form, casting white metal bearing material which is comformable and relatively softer than the strong, fatigue-resistant bearing material to form a composite tri-metal strip having barrel area means and flange area means of substantially the same thickness; working the steel at the flange area means to a substantially lesser thickness than the steel at the barrel area means; forming a flange sleeve bearing with the barrel area means of said strip forming the barrel of said bearing and with the flange area means of the strip forming the flange means of the bearing; and removing at least a substantial portion of the conformable cast white metal bearing material from the barrel portion of the bearing whereby the barrel portion of the formed bearing is formed essentially of strong bearing material, the surface of the flange means is formed of said conformable white metal bearing material.

References Cited

UNITED STATES PATENTS

| | | | |
|---|---|---|---|
| 1,892,173 | 12/1932 | Stockfleth | 29—149.5 |
| 2,124,060 | 7/1938 | Gilman | 29—149.5 |
| 2,124,132 | 7/1938 | Bate et al. | 29—149.5 |
| 3,251,119 | 5/1966 | Kingsbury et al. | 29—149.5 |

CHARLIE T. MOON, *Primary Examiner.*

THOMAS H. EAGER, *Examiner.*